US010082951B2

(12) United States Patent
Guiavarc'h et al.

(10) Patent No.: US 10,082,951 B2
(45) Date of Patent: Sep. 25, 2018

(54) SYSTEM AND METHOD FOR DIGITAL INK INTERACTIVITY

(71) Applicant: MyScript, Nantes (FR)

(72) Inventors: Jean-Nicolas Guiavarc'h, Nantes (FR); Stéphane Guyetant, Nantes (FR); Gildas Lemarié, Nantes (FR); Alain Chateigner, Nantes (FR)

(73) Assignee: MyScript, Nantes (FR)

( * ) Notice: Subject to any disclaimer, the term of this patent is extended or adjusted under 35 U.S.C. 154(b) by 0 days.

(21) Appl. No.: 15/083,195

(22) Filed: Mar. 28, 2016

(65) Prior Publication Data

US 2017/0199660 A1 Jul. 13, 2017

(30) Foreign Application Priority Data

Jan. 7, 2016 (EP) .................................... 16290002

(51) Int. Cl.

| | |
|---|---|
| ***G06K 9/00*** | (2006.01) |
| ***G06F 3/0488*** | (2013.01) |
| ***G06F 3/0354*** | (2013.01) |
| ***G06T 7/00*** | (2017.01) |

(52) U.S. Cl.

CPC ...... *G06F 3/04883* (2013.01); *G06F 3/03545* (2013.01); *G06K 9/00416* (2013.01); *G06T 7/0087* (2013.01)

(58) Field of Classification Search

USPC .......................................................... 382/189

See application file for complete search history.

(56) References Cited

U.S. PATENT DOCUMENTS

| | | | | |
|---|---|---|---|---|
| 5,500,937 A | | 3/1996 | Thompson-Rohrlich | |
| 5,864,636 A | * | 1/1999 | Chisaka ............. | G06K 9/00416 345/179 |
| 2015/0169975 A1 | * | 6/2015 | Kienzle .................... | G06K 9/34 382/189 |
| 2016/0012285 A1 | * | 1/2016 | Ahn .................. | G06K 9/00422 382/186 |
| 2016/0154997 A1 | * | 6/2016 | Kim .................... | G06F 3/04883 382/189 |

* cited by examiner

*Primary Examiner* — Jerome Grant, II

(74) *Attorney, Agent, or Firm* — McDermott Will & Emery LLP

(57) ABSTRACT

A system, method and computer program product for use in providing interactive ink from handwriting input to a computing device are provided. The computing device is connected to an input device in the form of an input surface. A user is able to provide input by applying pressure to or gesturing above the input surface using either his or her finger or an instrument such as a stylus or pen. The present system and method monitors the input strokes. The computing device further has a processor and an ink management system for recognizing the handwriting input under control of the processor. The ink management system is configured to cause display of, on a display interface of a computing device, first digital ink in accordance with first handwriting input, allocate references to ink elements of the first digital ink, map the references to corresponding recognized elements of the first handwriting input, and determine and store, in the memory of a computing device, ink objects including the references and mapped recognized elements.

18 Claims, 11 Drawing Sheets

SYSTEM AND METHOD FOR DIGITAL INK INTERACTIVITY

CROSS-REFERENCE TO RELATED APPLICATION

This application claims priority to European Application No. 16290002.1 filed on Jan. 7, 2016, the entire contents of which are incorporated by reference herein.

TECHNICAL FIELD

The present description relates generally to the field of ink management systems and methods using computing devices. The present description relates more specifically to managing ink which is handwritten to computing devices interfaces to provide interactivity of the ink.

BACKGROUND

Computing devices continue to become more ubiquitous to daily life. They take the form of computer desktops, laptop computers, tablet computers, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch physical or virtual surface. Any of these methods of input can be used generally for drawing or inputting text. The user's handwriting is interpreted using a handwriting recognition system or method.

There are many applications of handwriting recognition in portable computing devices, such as smartphones, phablets and tablets, such as is in note taking, document annotation, mathematical equation input and calculation, music symbol input, sketching and drawing, etc. Handwriting may also be input to non-portable computing devices, particularly with the increasing availability of touchscreen monitors for desktop computers and interactive whiteboards. These types of input are usually performed by the user launching a handwriting input application on the computing device which accepts and interprets, either locally in the device or remotely via a communications link of the device, handwritten input on the touch sensitive surface and displays or otherwise renders this input as so-called 'digital ink'. Conventionally such handwriting input applications are limited in their capabilities to provide a full document creation experience to users from the text and non-text (e.g., drawings, equations), since the focus of these applications has primarily been recognition accuracy rather than document creation. That is, available applications provide recognition of handwriting and conversion of the recognized handwriting into digital content, rendered as fontified or 'typeset ink', with various feedback mechanisms to the user, but that is generally the extent of the interaction available for the input.

If the user desires any further interaction with the output text, such as editing the content, manipulating the layout of content, or converting or adding the notes or other annotations into a document, the recognized handwriting content generally needs to be imported or otherwise integrated into a separate document processing application. This may be done automatically though the typesetting of the recognized handwriting into suitable typeset ink of suitable format or manually through redundant typing input of the handwriting, for example. The latter manual process is inherently counter-productive and is particularly performed when the perceived accuracy of the handwriting recognition is low, or the ability of the application to preserve the layout of the original handwriting is unreliable. The former automatic process itself does not present a great problem, however as the original layout of the handwriting and the actual input handwriting itself, the digital ink, is typically discarded in the import process, the user must refer back to the original handwriting in order to ascertain the original intent. For example, the user may have emphasized certain words or passages either by annotation or decoration, or through the layout of the content itself.

Some available digital handwriting applications provide the ability to edit the digital ink. However, this is generally done through the input of particular gestures for causing some sort of control, e.g., the launching of menus or running processes. The Applicant has found that when using handwriting applications users generally are unable or do not desire to learn specific gestures that are not natural or intuitive, or to make editing selections through menus and the like. Further, the requirement for particular learned methods to provide digital ink editing limits the usability of such applications, and digital handwriting more generally, as all users must learn the necessary behaviors for digital ink interaction.

Accordingly, in sharing or collaborative uses in which documents are created, edited, revised, reviewed, etc. by multiple parties, in particular parties from different areas or disciplines within enterprise organizations, for example, the ability of different 'team' members to interact with a digital document using handwriting varies such that the productivity possible is limited. For example, a member of upper management in the organization hierarchy may have limited experience with digital handwriting and therefore may not interact with documents using handwriting. Similar problems occur with non-handwriting tools conventionally used with document processing applications such as hardware tools, e.g., keyboard and mouse, and/or software tools, e.g., user interface (UI) tools and menus.

Further, the need to use specific UI and/or hardware tools for editing or other interactions with content created using digital handwriting, may cause disruption to the creative flow of users. As such, the manner of interaction with the content should be easy to use, intuitive and non-disruptive to the input of the content itself.

SUMMARY

The examples of the present invention that are described herein below provide systems and methods for providing interactive ink on computing devices.

In one example, the computing device may include a processor and at least one non-transitory computer readable medium for recognizing handwriting input under control of the processor. The non-transitory computer readable medium may be configured to cause display of, on a display interface of a computing device, first digital ink in accordance with first handwriting input, allocate references to ink elements of the first digital ink, map the references to corresponding recognized elements of the first handwriting input, and determine and store, in the memory of a computing device, ink objects including the references and mapped recognized elements.

The ink elements may be at least part of strokes of the first digital ink and the recognized elements may include at least part of strokes of the first handwriting input. Further, the recognized elements may be recognition candidates of the first handwriting input.

The at least one non-transitory computer readable medium may be further configured to determine content of second handwriting input by referring to the ink objects, and cause display of, on the display interface, second digital ink in accordance with the determined content of the second handwriting input. The second digital ink may be an edited version of at least part of the first digital ink.

In another example, the present invention includes a method for providing interactive ink on computing devices. Each computing device may comprise a processor and at least one non-transitory computer readable medium for recognizing handwriting input under control of the processor. The method includes the steps of displaying, on a display interface of a computing device, first digital ink in accordance with first handwriting input, allocating references to ink elements of the first digital ink, map the references to corresponding recognized elements of the first handwriting input, and determining and storing, in the memory of a computing device, ink objects including the references and mapped recognized elements.

The ink elements may be at least part of strokes of the first digital ink and the recognized elements may include at least part of strokes of the first handwriting input. Further, the recognized elements may be recognition candidates of the first handwriting input.

The method may further include the steps of determining content of second handwriting input by referring to the ink objects, and displaying, on the display interface, second digital ink in accordance with the determined content of the second handwriting input. The second digital ink may be an edited version of at least part of the first digital ink.

In another example, the present invention includes a non-transitory computer readable medium having a computer readable program code embodied therein. The computer readable program code may be adapted to be executed to implement a method for providing interactive ink to a computing device. The computing device may comprise a processor and at least one system non-transitory computer readable medium for recognizing the handwriting input under control of the processor. The method may include the steps of displaying, on a display interface of a computing device, first digital ink in accordance with first handwriting input, allocating references to ink elements of the first digital ink, map the references to corresponding recognized elements of the first handwriting input, and determining and storing, in the memory of a computing device, ink objects including the references and mapped recognized elements.

The ink elements may be at least part of strokes of the first digital ink and the recognized elements may include at least part of strokes of the first handwriting input. Further, the recognized elements may be recognition candidates of the first handwriting input.

The method may further include the steps of determining content of second handwriting input by referring to the ink objects, and displaying, on the display interface, second digital ink in accordance with the determined content of the second handwriting input. The second digital ink may be an edited version of at least part of the first digital ink.

BRIEF DESCRIPTION OF THE DRAWINGS

The present system and method will be more fully understood from the following detailed description of the examples thereof, taken together with the drawings. In the drawings like reference numerals depict like elements. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The use of the term 'text' in the present description is understood as encompassing all alphanumeric characters, and strings thereof, in any written language and common place non-alphanumeric characters, e.g., symbols, used in written text. Further, the term 'non-text' in the present description is understood as encompassing freeform handwritten or hand-drawn content and rendered text and image data, as well as non-alphanumeric characters, and strings thereof, and alphanumeric characters, and strings thereof, which are used in non-text contexts. Furthermore, the examples shown in these drawings are in a left-to-right written language context, and therefore any reference to positions can be adapted for written languages having different directional formats.

The various technologies described herein generally relate to capture, processing and management of hand-drawn and handwritten content on portable and non-portable computing devices in a manner which retains the inputted style of the content while allowing conversion to a faithful typeset or beautified version of that content. The systems and methods described herein may utilize recognition of users' natural writing and drawing styles input to a computing device via an input surface, such as a touch sensitive screen, connected to, or of, the computing device or via an input device, such as a digital pen or mouse, connected to the computing device or via a physical or virtual surface monitored by a position detection system. Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

Figure 1:
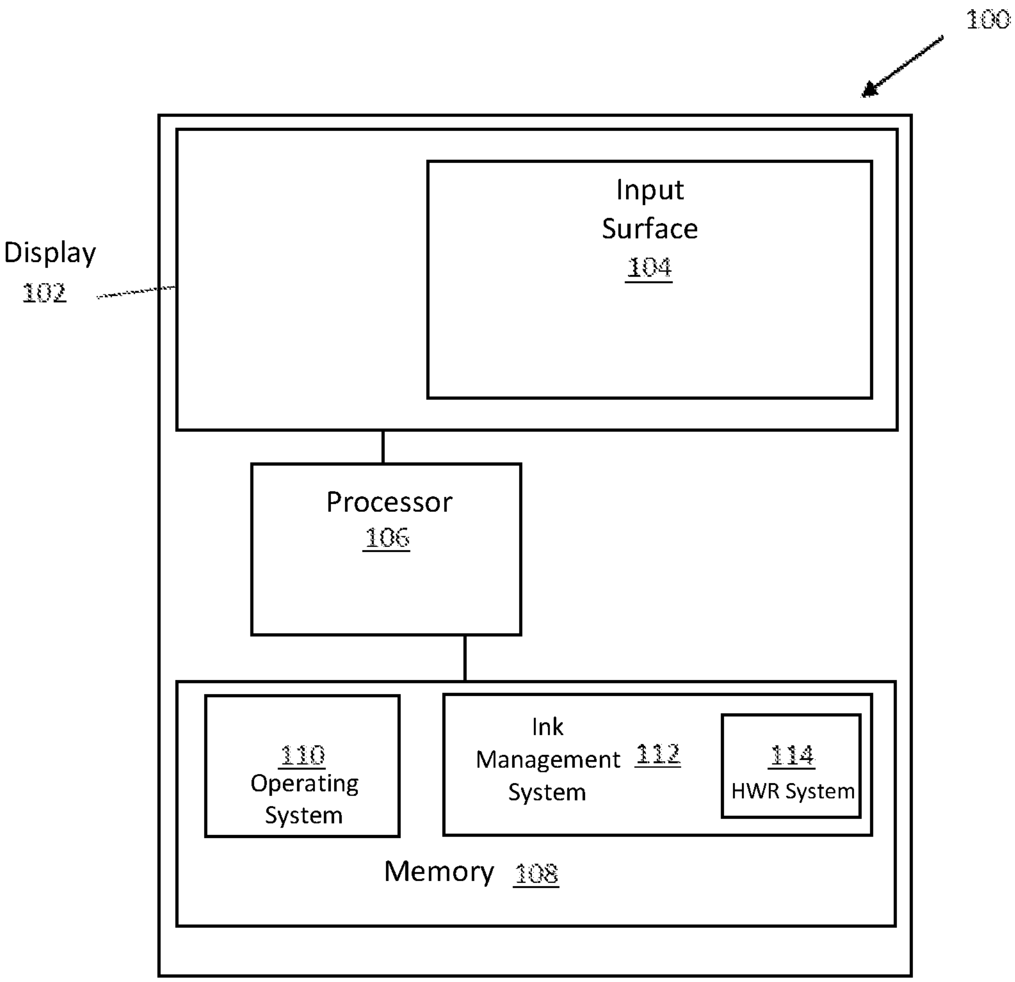
FIG. 1 shows a block diagram of a computing device in accordance with an example of the present system and method.

FIG. 1 shows a block diagram of an example computing device 100. The computing device may be a computer desktop, laptop computer, tablet computer, hybrid computers (2-in-1s), e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The illustrated example of the computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. At least some of the display 102 is co-located with at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input surface 104 may be bounded by a permanent or video-generated border that clearly identifies its boundaries. Instead of, or additional to, an on-board display, the computing device 100 may have a projected display capability.

The computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in the memory 108. The processor can be any custom made or commercially available general purpose processor, a central processing unit (CPU), commercially available microprocessors including a semiconductor based microprocessor (in the form of a microchip or chipset), microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD), or any other magnetic, resistive or phase-change nonvolatile memory). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and an ink management system 112. The ink management system 112 optionally further includes a handwriting recognition (HWR) system 114 which may each include one or more separate computer programs. Each of these has an ordered listing of executable instructions for implementing logical functions. The operating system 110 controls the execution of the ink manager 112 (and the HWR system 114). The operating system 110 may be any proprietary operating system or a commercially or freely available operating system, such as WEBOS, WINDOWS®, MAC and IPHONE OS®, LINUX, and ANDROID. It is understood that other operating systems may also be utilized. Alternatively, the ink management system 112 of the present system and method may be provided without use of an operating system.

The ink manager 112 includes one or more processing elements related to detection, management and treatment of user input (discussed in detail later). The software may also include one or more other applications related to handwriting recognition, different functions, or both. Some examples of other applications include a text editor, telephone dialer, contacts directory, instant messaging facility, computer-aided design (CAD) program, email program, word processing program, web browser, and camera. The ink manager 112, and the other applications, include program(s) provided with the computing device 100 upon manufacture and may further include programs uploaded or downloaded into the computing device 100 after manufacture.

The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programming languages for example but no limited to Hope, Rex, Common Lisp, Scheme, Clojure, Racket, Erlang, OCaml, Haskell, Prolog, and F#.

Alternatively, the HWR system 114 may be a method or system for communication with a handwriting recognition system remote from the device, such as server or cloud-based system, but is remotely accessible by the computing device 100 through communications links using the afore-mentioned communications I/O devices of the computing device 100. In FIG. 1, the HWR system 114 is shown as being incorporated in the ink manager 112, however it is possible the HWR system 114 is separate from and connected to the ink manager 112 either within the computing device 100 or remotely. Further still, the ink manager 112 and/or the HWR system 114 may be integrated within the operating system 110.

Strokes entered on or via the input surface 104 are processed by the processor 106 as digital ink. Users may enter a stroke with a finger or some instrument such as a pen or stylus suitable for use with the input surface. The user may also enter a stroke by making a gesture above the input surface 104 if technology that senses or images motion in the vicinity of the input surface 104 is being used, or with a peripheral device of the computing device 100, such as a mouse or joystick, or with a projected interface, e.g., image processing of a passive plane surface to determine the stroke and gesture signals. A stroke is characterized by at least the stroke initiation location, the stroke termination location, and the path connecting the stroke initiation and termination locations. Further information such as timing, pressure, angle at a number of sample points along the path may also be captured to provide deeper detail of the strokes. Because different users may naturally write the same object, e.g., a letter, a shape, a symbol, with slight variations, the HWR system accommodates a variety of ways in which each object may be entered whilst being recognized as the correct or intended object.

Figure 2:
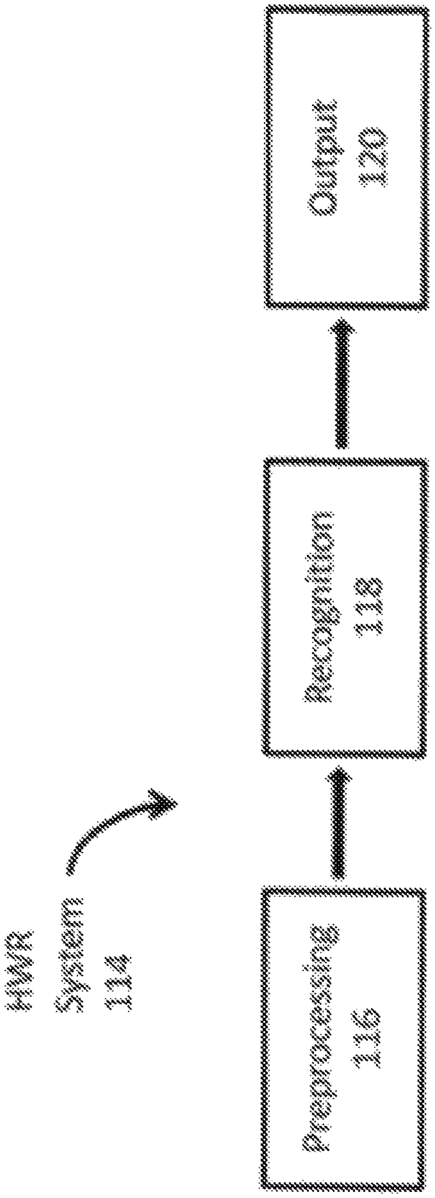
FIG. 2 shows a block diagram of a system for handwriting recognition in accordance with an example of the present system and method.

FIG. 2 is a schematic pictorial of an example of the HWR system 114, in either its local (i.e., loaded on the device 100) or remote (i.e., remotely accessible by the device 100) forms. The HWR system 114 includes stages such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the display 102 generally as a typesetted version of the handwritten elements/characters.

Figure 3:
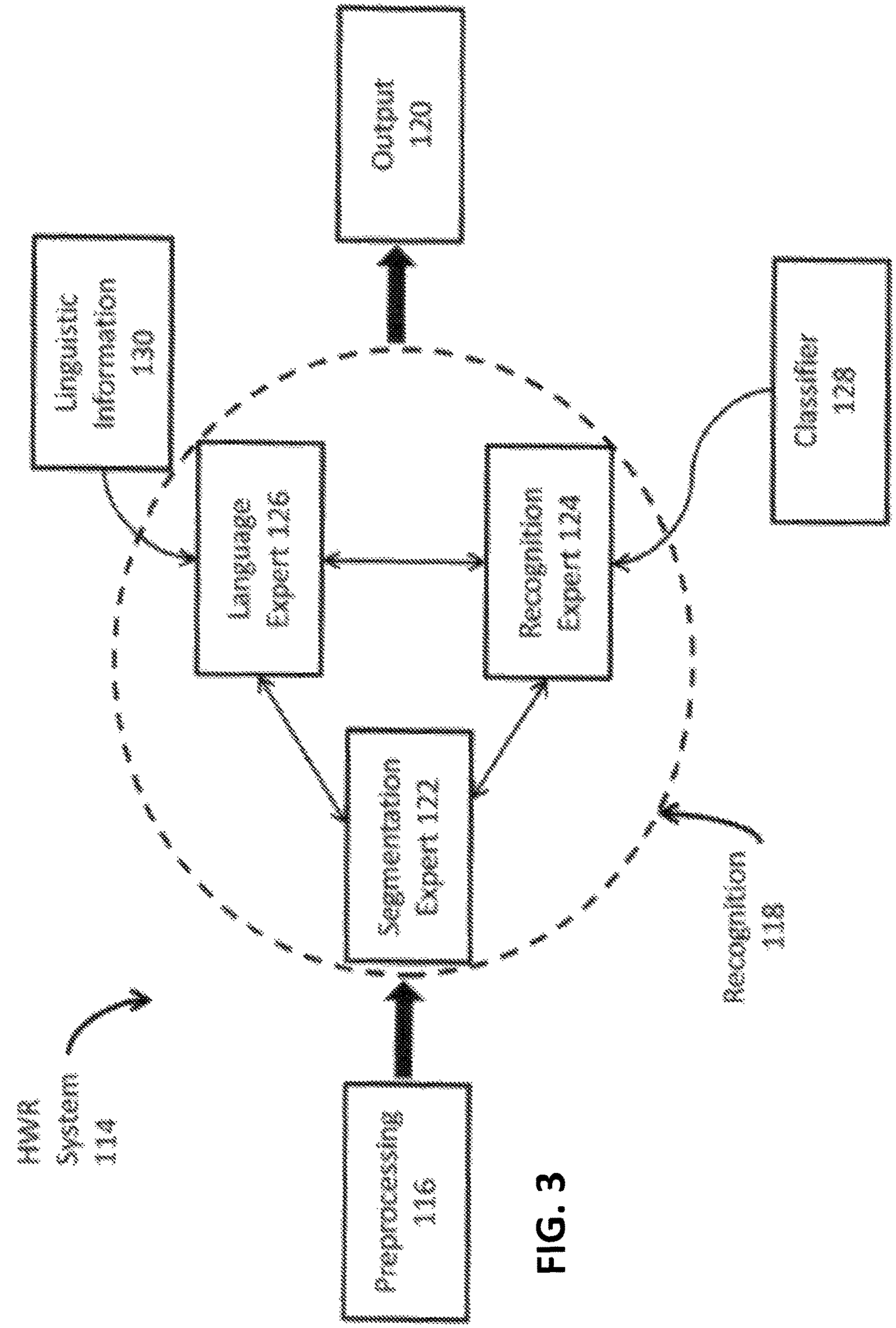
FIG. 3 shows a block diagram illustrating detail of the handwriting recognition system of FIG. 2 in accordance with an example of the present system and method.

The recognition stage 118 may include different processing elements or experts. FIG. 3 is a schematic pictorial of the example of FIG. 2 showing schematic detail of the recognition stage 118. Three experts, a segmentation expert 122, a recognition expert 124, and a language expert 126, are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. and is the storage for all static data used by the language expert 126 to execute a language model. A language model can rely on statistical information on a given language. The linguistic information 130 is computed off-line, with or without adaption according to the results of recognition and user interactions, and provided to the linguistic expert 126. The language expert 126 aims at finding the best recognition path. In one example, the language expert 126 does this by exploring a language model such as finite state automaton (FSA) representing the content of linguistic information 130. In addition to the lexicon constraint, the language expert 126 may use a language model with statistical information modeling for how frequent a given sequence of elements appears in the specified language or is used by a specific user to evaluate the linguistic likelihood of the interpretation of a given path of the segmentation graph.

The present system and method make use of the HWR system 114 in order to recognize handwritten input to the device 100. The ink management system 112 includes application(s) for handling the layout of the recognized user input. Such applications may be provided in an architecture with separate layers for handling different processing. One or more of these layers may be remote to the device 100 accessible via the communications channels mentioned earlier. The layers may include application wrapper(s), platform wrapper(s) and (platform specific) application user interface (s).

The ink management system 112 of the present system and method allows users to use natural writing to input content and to interact with the content to produce digital documents in sharable format on their portable or non-portable computing devices using natural and intuitive operations, such as gestures. Any person able to write is familiar with using handwriting to create and edit content. Any digital device user is already accustomed to gesturing on screen to write or edit content. Gesturing is a natural and intuitive pattern on touch and hover devices. These and other features of the present system and method are now described in detail.

Figure 4:
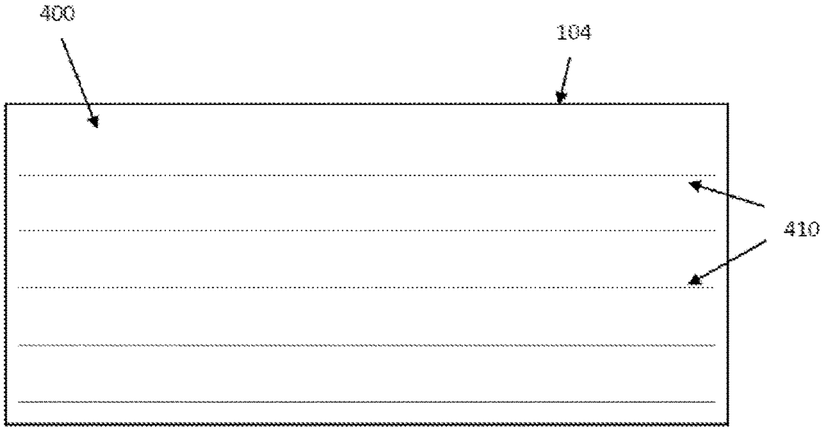
FIG. 4 shows a schematic view of an example visual rendering of an ink input area on a portion of an input surface of the computing device.

FIG. 4 shows a schematic view of an example visual rendering of an ink input or capture area 400 on a portion of the input surface 104 of an example computing device 100. The input area 400 is provided as a constraint-free canvas that allows users to create object blocks (blocks of text, drawings, etc.) anywhere without worrying about sizing or alignment. However, as can be seen an alignment structure in the form of a line pattern background 410 can be provided for guidance of user input and the alignment of digital and typeset ink objects. In any case, as users may input handwriting that is not closely aligned to the line pattern, or may desire to ignore the line pattern and write in a unconstrained manner, such as diagonally or haphazardly, the recognition of the handwriting input is performed by the HWR system 114 without regard to the line pattern. An example alignment pattern is described in United States Patent Application Publication No. 2017/0060819 titled "System and Method of Digital Note Taking" filed in the name of the present Applicant and Assignee, the entire content of which is incorporated by reference herein.

The input of handwritten content onto the input area 400 is performed through the use of gestures in relation to the input surface 104, e.g., through touch, force and/or proximity depending on the screen technology of the device 100. Gesture detection may be handled differently depending on the ability of the computing device 100 to differentiate a users' finger from a stylus or pen (by which the device defines passive and active styli) or the ability of a stylus to indicate or communicate to the device that it is being used for handwriting or the ability of users to provide such an indication. By default, and in devices which do not differentiate, any single-point touch or hover event within the input area 400 is to be considered as content input or content interaction. The present system and method through the HWR system 114 also provides a mechanism to digitize or convert the handwritten input through the typesetting or fontification of the digital ink into typeset ink. This function is particularly provided to allow the creation of at least near-final documents for communication and sharing, e.g., conversion of a handwritten note which has been edited and formatted in digital ink into a typeset document which could have been produced using keyboard (and associated gesturing devices) alone.

The handwritten input is detected by the ink management system 112 and rendered as digital ink on the surface 104 (or other display) as the input is received and is concurrently recognized by the HWR system 114 providing so-called 'on-the-fly' or incremental handwriting recognition. Incremental recognition is generally performed by parsing the (preprocessed) strokes to the recognizer as they are received and the recognizer processing groups of the strokes to output recognition results, even as input continues, where the results may be substantially immediately provided in the form of typesetting of the digital ink or displayed recognition candidates, or merely stored by the ink management system 112 for later use, e.g., by using the memory 108 of the device 100. Re-recognition may occur upon the input of further strokes that relate to earlier input strokes in a spatial manner, such as diacritics. Alternatively, or additionally, handwriting recognition may be performed as a batch process, rather than incrementally. In such an example, display of the digital ink and the typeset ink may occur during input at specified times, e.g., system and/or user specified, or may occur at a time after input on the same or different device, for example.

Figure 5:
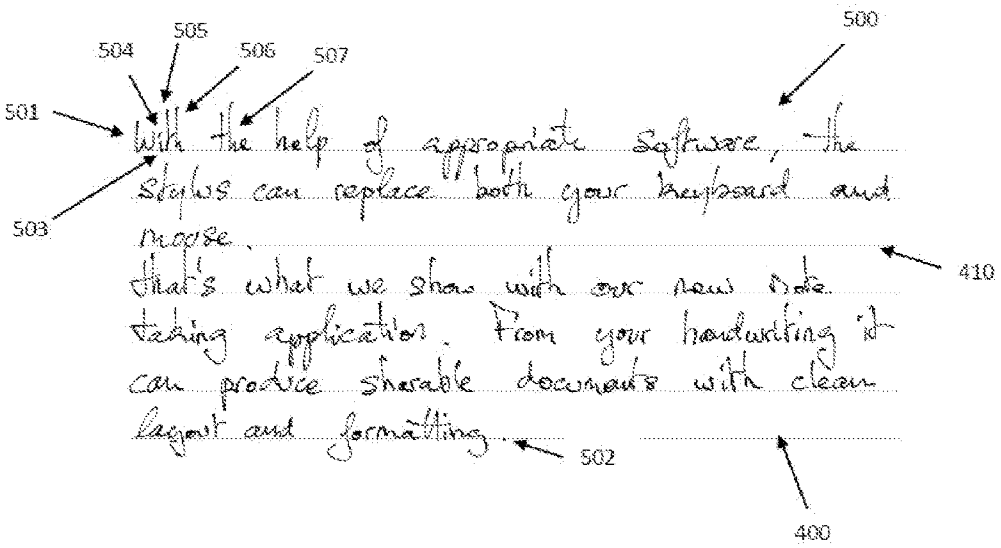
FIG. 5 shows example handwritten content input to the input area rendered as digital ink.
Figure 6:
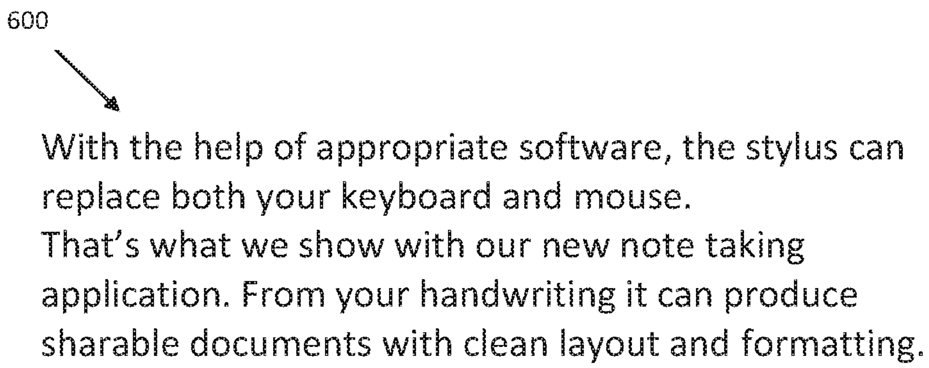
FIG. 6 shows the result of typesetting the handwritten content of FIG. 5.
Figure 7:
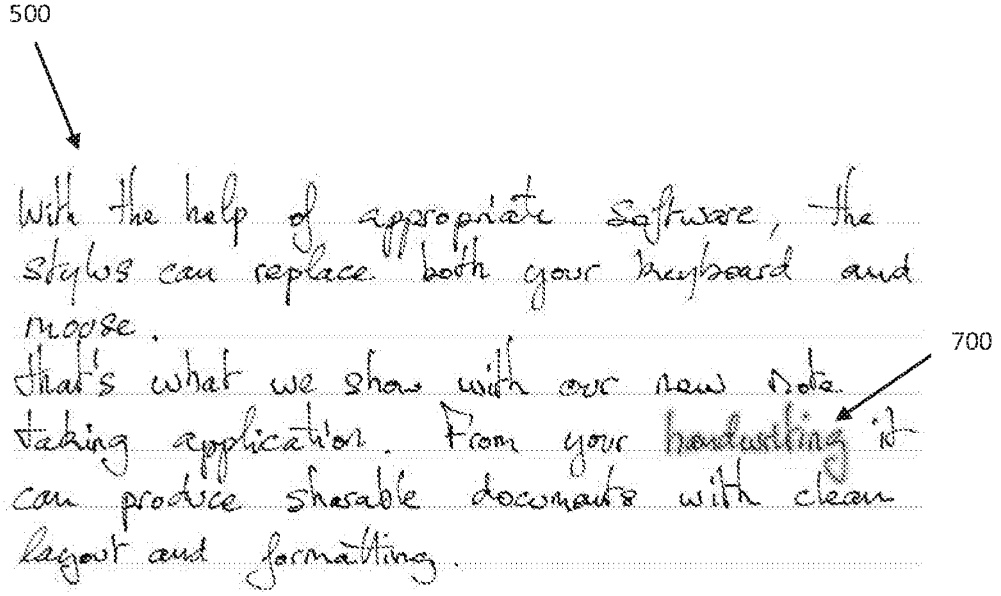
FIG. 7 shows the content of FIG. 5 with an example group of handwritten strokes highlighted.
Figure 8:
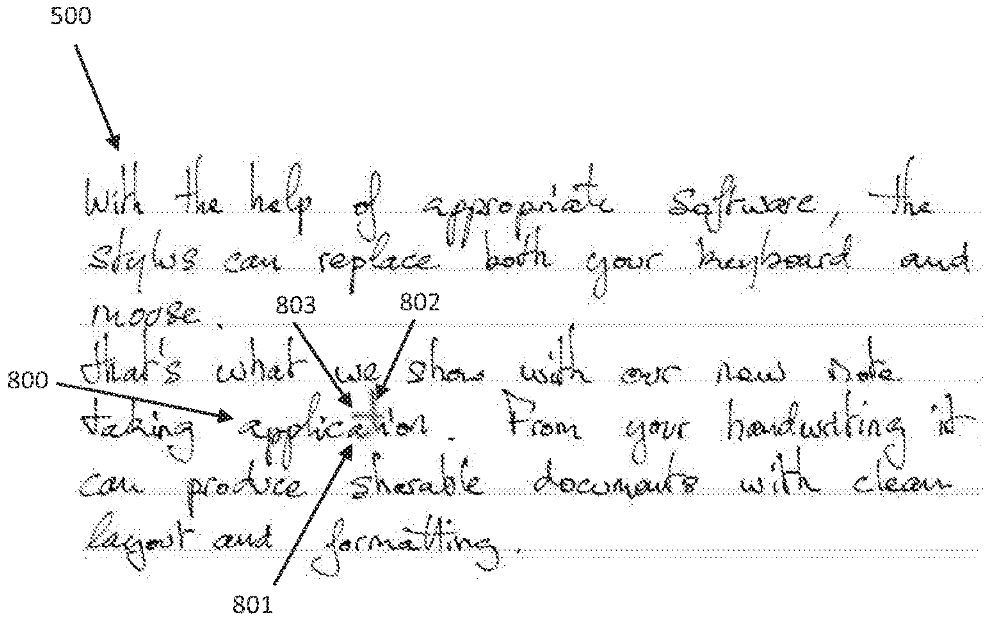
FIG. 8 shows the content of FIG. 5 with an example group of partial handwritten strokes highlighted.

FIG. 5 shows one (or two) multi-line paragraph(s) 500 input as handwritten content to the input area 400 generally on the lines of the line pattern 410 and rendered as digital ink on the interface surface of the device, for example. FIG. 6 shows the result of typesetting the paragraph(s) 500 into a typeset paragraph(s) 600.

The ink management system 112 of the present system and method manages the handwritten input and digital ink representation thereof in a manner which is similar to the management of digital content, such as typed ink, conventionally employed by the operating system 110 and the components and applications thereof. That is, if the content 600 was input to the computing device 100 by typing using keyboard rather than handwritten, the keyboard or typing decoder of the computing device 100, e.g., provided as an application in the memory 108, as part of the operation system 110, or in the present system and method as part of the ink management system 112, would interpret and encode each element of the content, being the paragraph 600 itself, the sentences contained in the paragraph, the words and symbols (e.g., grammatical marks, such as periods, commas) contained in the sentences and the characters or letters contained in the words, in the digital content. Similar management also applies if the content 600 was input via other means, such as optical character recognition (OCR) from digital or non-digital (e.g., paper ink) handwriting. This digital content is handled by the computing device 100 in a well understood manner, with each digital character treated as a digital object. In this way, functions such as input or editing cursor placement for interaction with the digital content can be made in relation to each digital object.

However, unlike the decoding process for typed input in which keystrokes on a keyboard are directly interpreted into 'digital objects' (e.g., the typed letter "a" as depicted in this text is a digital object), the recognition process for handwriting input generally takes a probabilistic approach to interpreting hand-drawn strokes on or to the interface surface to find the most probable candidates for characters. Conventional digital handwriting systems and methods using such probabilities generally provide the highest probability character and word candidates as recognized content, such that upon typesetting the recognized content is converted to the digital content at which time the recognized content, and as such the recognition result, is discarded. Any recognition errors can then be corrected through interaction with the digital content using the conventional digital content management techniques described above. The number of such errors carried through with the typeset conversion can be minimized through certain feedback mechanisms during input, such as display of candidate lists, auto-correction based on the language model(s), or use of substantially real-time recognition result display, such as described in United States Patent Application Publication No. 2017/0060406 titled "System and Method of Guiding Handwriting Input" filed in the name of the present Applicant and Assignee, the entire content of which is incorporated by reference herein.

Digital content management only takes account of the digital objects through reference to the metadata of the digital objects. This metadata provides information on the object type, font, styling, relative position, embedded data or hyperlinks, etc. of the digital content, but does not provide any further information such as the word to which each character belongs, the context of the character, object candidates. Accordingly, any subsequent interaction with the digital objects is made independent of the proximate digital objects. The handwriting recognition process however provides a vast amount of information with respect to each recognition object, e.g., each recognized character, which can be used to guide and augment subsequent interaction with the content. The present system and method provide ways to leverage this recognition information to provide levels of interaction with handwritten and digital content which enhance creativity, usability and productivity for content creation, editing, sharing and collaboration, as described below.

The present system and method references or links the 'raw' or input ink (e.g., the handwritten strokes) to the digital ink (e.g., the displayed ink). By this link, the relationship between the actual input, as recognized by the HWR system 114, and the displayed input is known by the system, such that user interaction with the digital ink, for example, to edit the content, is performed in relation to the underlying recognition. This 'marrying' of the recognized ink and digital ink forms 'ink objects'. Each ink object has metadata including information similar to that of the digital objects but also further information related to the recognition processing. An example reference system and method is now described with reference to FIGS. 5 and 7 to 12.

In FIG. 5, the paragraph(s) 500 is the digital ink representation of the underlying raw ink input of a paragraph(s) of handwritten text. The raw ink includes a number of ink strokes written in temporal and spatial order. In the context of the left-to-right and top-to-bottom language depicted in the example of FIG. 5, the first stroke is stroke 501 (represented as the digital ink character 'W') at the beginning of the paragraph 500 and the final stroke is stroke 502 (represented as the digital ink character ".") at the end of the paragraph 500. As the ink input is received, the present system and method sequentially indexes each element of the input, such as the strokes characterized by the ink between each detected subsequent stroke initiation (or 'pen down') and termination (or 'pen up') locations, in time order, by allocating a reference to each element and its features, for example.

For example, for the paragraph 500, the stroke 501 may be indexed as stroke [0] (zero) and the stroke 502 may be indexed as stroke [244]. The indexation in time order means that strokes that are positionally out of order, such as diacritics, strokes added later, etc., have later indexing than proximate strokes, e.g., stroke 503 (represented as the digital ink character "i" without the dot "·") may be indexed as stroke [1] (one) and stroke 504 (represented as the dot "·") may be indexed as stroke [4] as it is written after strokes 505 and 506, for example. Alternatively or additionally, the strokes may be re-indexed to take account of spatial order rather than time order. Further, the indexing may occur in either or both fashions for bulk input, such as OCR input.

This stroke index provides a coarse indexation of the input which can be used to define features of the input, such as character and word boundaries. For example, user interaction with the digital ink character 501, represented as stroke index [0], for example, with a gesture on the digital ink, such as a single or multi-point gesture (e.g., a tap, long press or double tap), may cause selection of the character and/or provision of an input cursor at the character boundary, similar to interaction with digital objects. However, unlike digital objects, due to the stroke index, this interaction also references the underlying recognition result(s), "character[0]", which provides features as discussed in more detail later. Briefly here however, the indexing to the stroke index, e.g., index [0], remains stable even if the stroke is transformed, e.g., partially erased, erased, omitted through an 'undo' action, fontified or typeset, and any new strokes for this transformation are allocated or assigned new stroke indices which still internally reference the previous stroke index, e.g., index [0], thereby retaining the link to the recognition results. Further, in FIG. 7 a group of strokes 700 (represented as the digital ink word "handwriting") of the paragraph 500 (highlighted in the display of FIG. 7 for illustration purposes) includes the stroke indexes of stroke [172] to stroke [183], represented as stroke index [172, 183], for example. User interaction with the digital ink word 700 with a gesture on the digital ink, such as a single or multi-point gesture (e.g., a tap, long press or double tap), anywhere within or near the word 700 may cause selection of the entire word and/or provision of a cursor at the word boundary, similar to interaction with digital objects. However, unlike digital objects, due to the stroke index, this interaction also relates to the underlying recognition result (s), "word[172, 183]", which provides features as discussed in more detail later.

As discussed earlier, in the recognition process the strokes are segmented in order to determine probable character candidates. A similar (or the same or actual) segmentation approach is taken by the present system and method to refine the indexation of the input. This segmentation involves segmenting each indexed stroke into a number of stroke segments and indexing each stroke segment at the point between each stroke segment. For example, the stroke 501 may be indexed with a series of 50 stroke segments from point 0 (zero) to point 50, say, represented as stroke and point ("reference") index [0:0, 0:50], for example. The position of each point may be set by segmenting the strokes in a regular manner, e.g., each stroke segment has the same length (such as number of pixels with respect to the digital ink representation), in accordance with the stroke characteristics, or in accordance with the device sampling and any possible pre-sampling applied by the system.

In the latter case, the raw input samples (as given by the computing or capturing device, as stored in the memory 108 for example) of each input event, such as pen down, pen move, direction change, pen up, are used by the ink management system 112 as a new point or sample in the input stroke(s). Further, instead of the raw input samples, smoothing units could be used by the ink management system 112 in which the raw input samples are processed and output as a different number and position of samples. In this case, the segmentation regime or segment length itself is immaterial to the indexing applied, rather it is the 'smoothness' of the digital ink as segmented which provides optimized indexing. It is noted however that such smoothing of the input may invalidate biometric processing of the digital ink, such as for signature authentication. Further, smoothing suitable for display may be different from smoothing suitable for recognition. As such, smoothing may be performed by the ink management system 112 itself at different stages than smoothing at input and rather than by any processing of the device 100 itself.

In any case, the number of stroke segments set the number of points in each index. As discussed above, user interaction with the digital ink character 501 with a gesture on the digital ink may cause selection of the character and/or provision of a digital cursor at the character boundary, such that the cursor is provided at the reference or stroke:point index [0:50]. Accordingly, the cursor position is defined by i:j, where 'i' is the stroke index and 'j' is the point index. Due to the point index, this interaction also relates to the underlying recognition result(s), "character[0:0, 0:50]", which provides features as discussed in more detail later.

The point index provides a fine indexation of the input which can be used to define further features of the input, such as character boundaries within strokes. As can be seen, each stroke of the raw (and digital) ink may belong to more than one text character (e.g., stroke 507 is represented as the digital ink characters "h" and "e") or be a part of one character (e.g., the strokes 503 and 504 combine to form the character "i"). Similar stroke attribution can also occur with non-text objects, such as shapes. As discussed above, the segmentation process of the recognition system segments each stroke into many segmentation possibilities represented by the segmentation graph. By this process, the characters "h" and "e" of the stroke 507 are correctly recognized, for example. The fine indexation of the present system and method provides a similar segmentation result. For example, the stroke 507 may be indexed as stroke [9] and with a series of 60 stroke segments from point 0 (zero) to point 60, say, represented as reference index [9:0, 9:60], for example. The character boundary between the characters "h" and "e" may, for example, be at point 30, such that the character "h" has reference index [9:0, 9:30] and the character "e" has reference index [9:30, 9:60]. Alternatively, contiguous characters may not share indexing, such that index [9:30] is not shared, for example. Accordingly, user interaction with the digital ink characters 507 with a gesture on the digital ink at or near the character boundary may cause provision of a digital cursor at the character boundary, such that the cursor is provided at the reference index [9:30]. Due to the stroke and point index, this interaction also relates to the underlying recognition result(s), "characters[9:0, 9:60]", which provides features as discussed in more detail later.

The fine indexation of the point index can be used to define further features of the input, such as partial strokes. For example, in FIG. 8 a group of strokes 800 (represented as the digital ink word "application") of the paragraph 500 has stroke 801 (represented as the digital ink character "a"), stroke 802 (represented as the digital ink characters "t" and "i" without the bar "-" and dot "·", respectively) and stroke 803 (represented as the bar "-"). The stroke 801 may be indexed as stroke [158] and with points 0 (zero) to 50, say. The stroke 802 may be indexed as stroke [159] and with points 0 (zero) to 40, say. The stroke 803 may be indexed as stroke [161] and with points 0 (zero) to 14, say (e.g., the stroke represented as the following digital ink characters "o" and "n" is input before the stroke 802 and therefore provide stroke [160]). User interaction with the digital ink word 800 with a gesture on the digital ink, such as a single or multi-point gesture (e.g., a tap, long press or double tap), at parts of the strokes of the digital ink may cause selection of only those parts of the strokes. For example, in FIG. 8 interaction (highlighted in the display of FIG. 8 for illustration purposes) with parts of the strokes 801 and 802 includes the reference index [158:44, 159:20], and with all of the stroke 803 includes the reference index [161:0, 161:14], for example. Due to the stroke and point indexes, this selection also relates to the underlying recognition result(s) of the partial characters, which provides features as discussed in more detail later.

Figure 9:
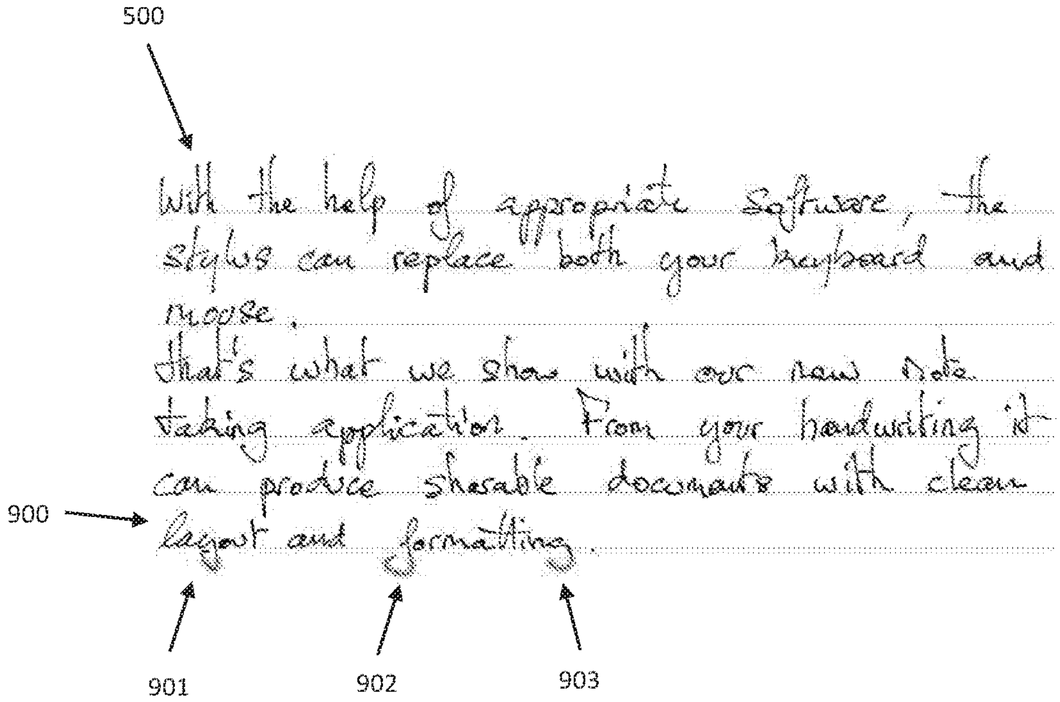
FIG. 9 shows the content of FIG. 5 with an example group of partial handwritten strokes highlighted.

Further, in FIG. 9 a group of strokes 900 (represented as the digital ink words "layout and formatting") of the paragraph 500 has stroke 901 (represented as the digital ink character "y" in the word "layout"), stroke 902 (represented as the digital ink character "f" in the word "formatting") and stroke 903 (represented as the digital ink characters "n" and "g" in the word "formatting"). The stroke 901 may be indexed as stroke [215] and with points 0 (zero) to 60, say. The stroke 902 may be indexed as stroke [233] and with points 0 (zero) to 60, say. The stroke 903 may be indexed as stroke [243] and with points 0 (zero) to 54, say. User interaction with the digital ink 900 with a gesture on the digital ink, such as a single or multi-point gesture (e.g., a press and swipe), at parts of the strokes of the digital ink may cause selection of only those parts of the strokes. For example, in FIG. 9 interaction (highlighted in the display of FIG. 9 for illustration purposes) with part of the stroke 901 (the descender of "y") includes the reference index [215:36, 215:48], with part of the stroke 902 (the underwrite or descender of "f") includes the reference index [233:35, 233:54] and with part of the stroke 903 (the descender of "g") includes the reference index [243:37, 243:54], for example. Due to the stroke and point indexes, this selection also relates to the underlying recognition result(s) of the partial characters, which provides features as discussed in more detail later.

Further still, increased precision for such user interaction can be provided by further segmenting between the points of the point index. For example, regular or stroke defined sub-points can be defined between each pair of consecutive points to provide a decimal part of the point index. The fractional precision can be, for example, about 1/50$^{th}$ to about 1/300$^{th}$ of each stroke segment. However, less or more precision can be provided. For example, in FIG. 9, 1/200$^{th}$ sub-points are provided such that the displayed interaction with the part of the stroke 901 includes the reference index [215:36.665, 215:48.265], with the part of the stroke 902 includes the reference index [233:35.585, 233:54.71] and with the part of the stroke 903 includes the reference index [243:37.495, 243:54], for example. Due to the stroke and decimal-point indexes, this selection also relates to the underlying recognition result(s) of the partial characters with greater precision, which provides features as discussed in more detail later.

The above described reference indexing system employed by the present system and method provides a reference between the displayed digital ink and the recognition result (s) from the raw ink. This reference once determined by the ink management system 112 may be stored, for example, in the memory 108 of the computing device 100, for later use upon detection of user interaction with the digital ink, for example. As described above, the reference index is included as metadata with the digital content represented by the raw, recognized and digital ink as ink objects. Accordingly, the ink objects are transportable, so that the digital content can be exported, imported and otherwise transferred or transformed between different applications and operating systems. That is, like any other digital content, the reference metadata is maintained with the ink object content itself. Because the reference index remains with the digital ink it is not necessary that the raw ink itself, e.g., the original handwritten input, be preserved, thereby reducing the amount of data to be stored and increasing the portability of the ink management system 112, as it is not necessary for a database of the raw ink to be addressed when interpreting ink object interaction. Full capability of the reference system is retained however even if the raw ink itself is not retained. This and the above-discussed features are now described in detail.

Figure 10:
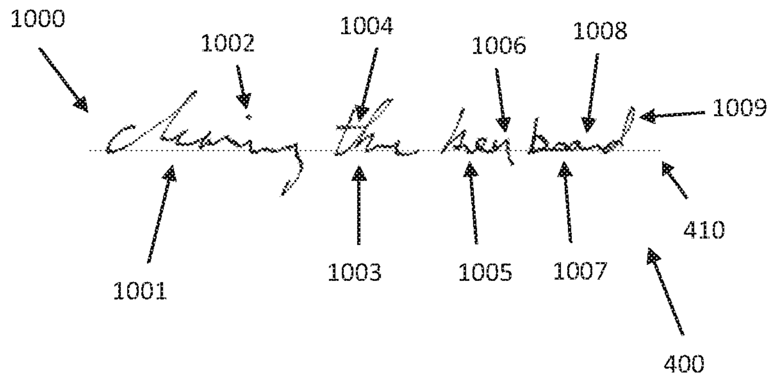
FIG. 10 shows example handwritten content input to the input area rendered as digital ink.
Figure 11A:
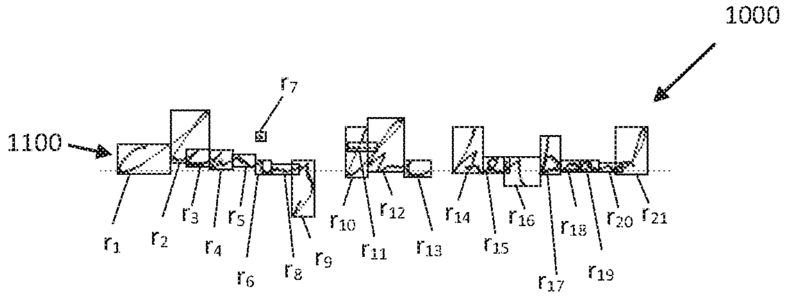
FIG. 11A shows the handwritten input of FIG. 10 with a representation of an example reference segmentation.
Figure 11B:
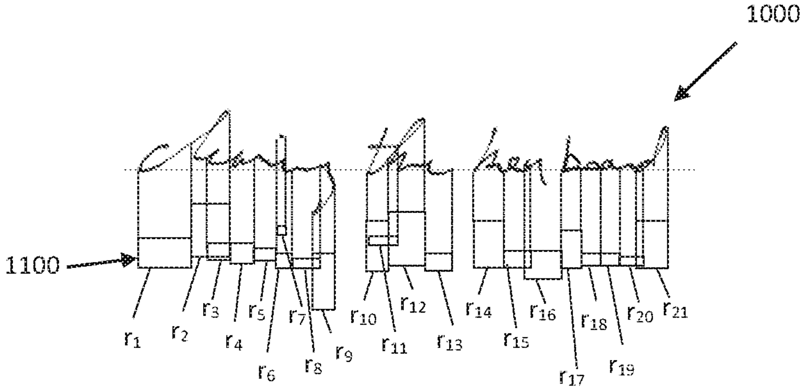
FIG. 11B shows the reference segmentation isolated from the digital ink of the handwritten input.

FIG. 10 shows a phrase 1000 containing several words input as handwritten content to the input area 400 generally on the lines of the line pattern 410 and rendered as digital ink on the interface surface of the device, for example. The raw (and digital) ink 1000 includes a number of strokes 1001 to 1009 representing text characters which form the phrase "cleaning the keyboard". As discussed earlier, the ink management system 112 segments the strokes to determine the reference index of the input, and therefore the digital ink. FIG. 11A shows the handwritten input 1000 with a representation of an example reference segmentation 1100 of the phrase "cleaning the keyboard" as determined by the ink management system 112 and/or the HWR system 114. The reference segmentation 1100 is illustrated as a series of boxes $r_m$ designating the general digital ink bounds or extent of each reference indexed portion of the digital ink 1000. FIG. 11B shows these boxes $r_m$ isolated from the digital ink 1000 with the stroke index points shown by dashed lines.

The stroke index may be for example: the stroke 1001 as stroke [0] (zero), the stroke 1002 as stroke [1], the stroke 1003 as stroke [2], the stroke 1004 as stroke [3], the stroke 1005 as stroke [4], the stroke 1006 as stroke [5], the stroke 1007 as stroke [6], the stroke 1008 as stroke [7], and the stroke 1009 as stroke [8]. For example, the stroke 1001 is long and may therefore be segmented to have 300 points, say, such that reference index $r_1$ corresponds to [0:0, 0:35], reference index $r_2$ corresponds to [0:35, 0:90], reference index $r_3$ corresponds to [0:90, 0:125], reference index $r_4$ corresponds to [0:125, 0:170], reference index $r_5$ corresponds to [0:170, 0:210], reference index $r_6$ corresponds to [0:210, 0:225], reference index $r_8$ corresponds to [0:225, 0:265], and reference index $r_9$ corresponds to [0:265, 0:300]. As described above, extra precision can be provided by also referring to sub-points. Similar reference indexes are determined for the other strokes 1002 to 1009.

Figure 12A:
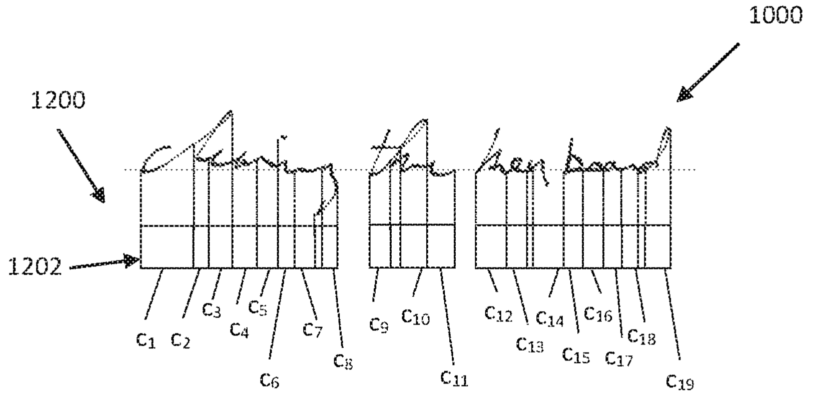
FIG. 12A shows the handwritten input of FIG. 10 with a representation of an example recognition.

As discussed earlier, in the recognition process the strokes 1001 to 1009 are segmented in order to determine probable character candidates which lead to the recognition of the words of the phrase 1000. The ink management system 112 utilizes the reference segmentation 1102 which may be independent of the segmentation produced by the HWR system 114 or the reference segmentation 1102 may be that provided by the HWR system 114 (or at least produced using a similar process). In either case, the reference segmentation of the strokes of the input/digital ink provides a map to the underlying recognition results as follows, for example. FIG. 12A shows the handwritten input 1000 with a representation of an example recognition 1200 of the phrase "cleaning the keyboard". It is noted that the example recognition is not itself displayed as depicted. As can be seen, the recognition 1200 includes a segmentation 1202 of the strokes 1001 to 1009 of the input 1000 (shown by dashed lines) to produce a series of recognized characters $C_n$. The recognized characters $C_n$ include "c" $C_1$, "l" $C_2$, "e" $C_3$, "a" $C_4$, "n" $C_5$, "i" $C_6$ including the dot "·", "n" $C_7$, "g" $C_8$, "t" $C_9$ including the bar "-", "h" $C_{10}$, "e" $C_{11}$, "k" $C_{12}$, "e" $C_{13}$, "y" $C_{14}$, "b" $C_{15}$, "o" $C_{16}$, "a" $C_{17}$, "r" $C_{18}$, and "d" $C_{19}$. It is noted that in the recognition processing, the "n" $C_5$ may also be recognized as an "r" to provide the word candidate "clearing", instead of "cleaning" with similar or different probabilities based on the language model of the HWR system 114. Other alternative character recognitions are also possible. Further, the numbering order of the candidates is only for descriptive purposes and does not necessarily reflect the manner in which the HWR system 114 identifies recognized characters, if this is done. Further still, the use of boxes to designate the recognized characters in the drawings is for illustrative purposes only.

As can be seen the recognition segmentation 1202 corresponds generally with the reference segmentation 1102. Accordingly, the ink management system 112 maps the reference indexes $r_m$ to the candidate characters $C_n$. For example, the stroke 1001 contains several characters, namely characters $C_1$ to $C_8$, such that character $C_1$ corresponds to reference index $r_1$, character $C_2$ corresponds to reference index $r_2$, character $C_3$ corresponds to reference index $r_3$, character $C_4$ corresponds to reference index $r_4$, character $C_5$ corresponds to reference index $r_5$, character $C_6$ corresponds to reference indexes $r_6$ and $r_7$ combined (e.g., the complete character "i"), character $C_7$ corresponds to reference index $r_8$, and character $C_8$ corresponds to reference index $r_9$. Similar mapping of the candidate characters and reference indexes are determined for the other strokes 1002 to 1009. Accordingly, the underlying recognition 1202 of the digital ink 1000 may be determined via the reference indexing as word[0:0, 1:10] corresponding to "cleaning", word [2:0, 3:10] corresponding to "the", and word[4:0, 8:40] corresponding to "keyboard", for example. This reference or link between the recognized elements, such as characters and words, and the corresponding digital ink elements provides the ink objects, where a first ink object corresponds to the reference index [0:0, 1:10], a second ink object corresponds to the reference index [2:0, 3:10] and a third ink object corresponds to the reference index [4:0, 8:40], in this present example.

In this way, the ink management system 112 links or maps the digital ink strokes with the underlying recognition result provided by the handwriting recognition process. This mapping is provided regardless of the manner in which the digital ink is rendered. That is, the digital ink, being a displayed version of the raw ink input, may be rendered with a different size, style, font, etc. than the original handwriting through transposition or so-called 'beautification'. This is particularly the case if the handwriting is input in a different area than the display itself, in a restricted area, or in a relatively free manner without respect to layout elements, such as the line pattern, in which cases the digital ink is rendered relatively independently of the input raw ink. The mapping of such transposed or beautified digital ink to the recognized ink is possible however so long as the transposition or beautification characteristics are known, such as described in, for example, U.S. patent application Ser. No. 14/978,081 titled "System and Method for Beautifying Digital Ink" filed in the name of the present Applicant and Assignee, the entire content of which is incorporated by reference herein.

The digital to recognized ink map supports user interactivity with the digital ink, and therefore the ink objects, as interactions with the digital ink (for example, in a manner as described earlier), are referred to interactions with the underlying recognized ink through this link, and therefore editing of the digital ink, such as changes to existing content, input of new content, are managed by the ink management system 112 with recourse to existing and new recognition results. This is now described in detail.

Figure 12B:
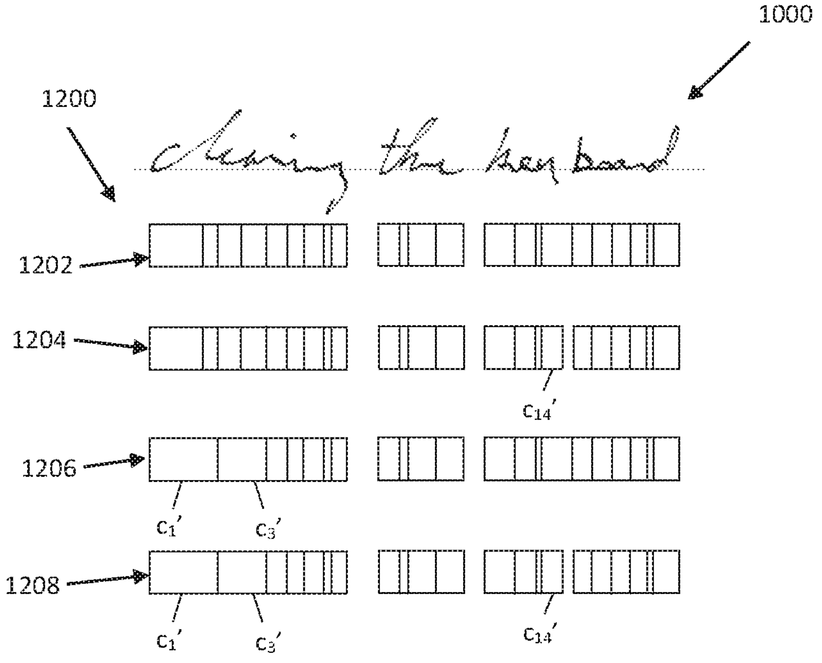
FIG. 12B shows the handwritten input of FIG. 10 with representations of several example segmentations of the recognition.

In the probabilistic approach to handwriting recognition taken by the HWR system 114, many potential object candidates, such as character candidates for text input, shape candidates for shape input, notation candidates for music input, are tested via the segmentation graph and the most probable candidates are returned to provide the recognition result. However, upon outputting the recognition result, the HWR system 114 does not discard (all) the other candidates or at least does not discard the top candidates, such as the 5, 10, etc. most likely candidates, for example. This is, at least in part, because the recognition result, while the most likely based on the various experts and models employed by the HWR system 114 at the time, may not be correct and users may therefore be provided with the other candidates for selection, via interactive UI menus or the like, in order to correct the recognition result, for example, such as described in the afore-incorporated by reference United States Patent Application Publication No. 2017/0060406. Each one of these character candidates maps onto the digital ink in a similar manner as illustrated in the example of FIG. 12A. That is, the candidates correspond to certain segmentations of the raw ink, and therefore also of the digital ink. FIG. 12B shows the handwritten input 1000 with representations of several segmentations 1204, 1206 and 1208 of the example recognition 1200 of the phrase 1000.

The segmentation 1204 of the strokes 1001 to 1009 is similar to the segmentation 1202 however in this segmentation the stroke 1006 is segmented to treat the apparent space between the strokes 1006 and 1007 as a space, such that the character candidate $C_{14}$ corresponding to "y" in the segmentation 1202 is not present and instead character candidate $C_{14}'$ results corresponding to "n" for the candidate recognition "cleaning the ken board" (or "clearing the ken board as discussed earlier). It is noted that in the recognition processing, the "n" $C_{14}'$ may also be recognized as a "y" to provide the word candidate "key", instead of "ken" with similar or different probabilities based on the language model of the HWR system 114.

The segmentation 1206 of the strokes 1001 to 1009 is similar to the segmentation 1102 however in this segmentation the stroke 1001 is segmented such that the character candidates $C_1$, $C_2$, $C_3$ and $C_4$ corresponding to "c", "l", "e" and "a", respectively, in the segmentation 1202 are not present and instead character candidates $C_1'$ and $C_3'$ result corresponding to "d" and "u", respectively, for the candidate recognition "during the keyboard".

The segmentation 1208 of the strokes 1001 to 1009 is a combination of the segmentations 1204 and 1206 to produce the candidate recognition "during the ken board" (or "during the key board" as described above). These different segmentations may correspond to the most likely recognition candidates, e.g., those returning the highest probability scores. While four most likely recognition candidates are shown, it is understood that more or less may be provided by the present system and method. Further, the order of the candidates 1202 to 1208 is only illustrative and does not imply the order of candidate likelihood. Examples of the manner in which this mapping of candidate recognitions to the digital ink supports interactivity is now described.

Figure 13A:
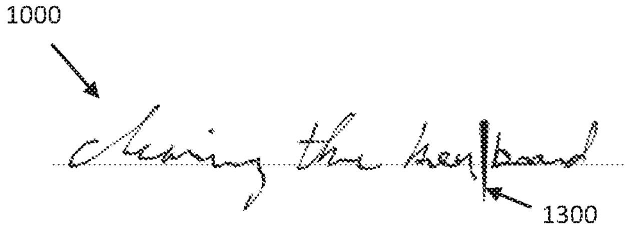
FIG. 13A shows the digital ink of FIG. 10 with an example input editing gesture.
Figure 13B:
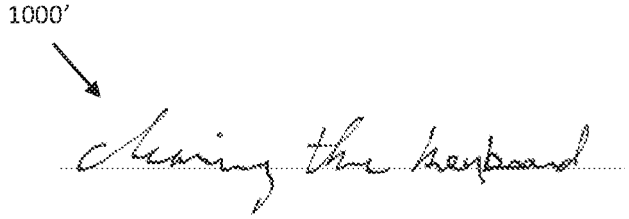
FIG. 13B shows an example adjustment of the digital ink based on the editing gesture of FIG. 13A.

FIG. 13A shows the digital ink 1000 with an editing gesture 1300 detected by the ink management system 112 and/or the HWR system 114 as input as a bottom-to-top vertical line in a single stroke by a user swiping their finger or stylus tip from the bottom to the top in the displayed position shown, for example. That is, the stroke start position is below the stroke end position, in time order, as depicted by the gradual thickening of the stroke from the bottom to the top. The illustrated characteristic of the editing stroke is an example, and other characteristics are possible, such as scratch-out, as are other forms of editing commands (described in detail later). For example, as with digital objects, editing of the ink objects can also be achieved through other actions and tools, such as keyboard, UI buttons or menus, combined with a cursor or selection of ink as editable content. The editing stroke 1300 is detected as passing between the strokes 1006 and 1007, and as such the ink management system 112 knows the relative location of the editing stroke 1300 not only from the digital ink 1000 but also from each of the candidate recognitions, e.g., 1202 to 1208, of the underlying recognized ink 1200. Consideration of this relative location of the editing gesture 1300 and its bottom-to-top writing direction characteristic may result in a determination that the editing gesture 1300 is intended by the user to delete a space at the detected location, particularly with respect to the recognition candidates 1202 and 1208 (described in detail below). With this determination, the ink management system 112 causes the digital ink 1000 to be re-rendered as edited digital ink 1000' as shown in FIG. 13B, in which the strokes 1006 and 1007 are joined together. This editing of the digital ink is accompanied by any suitable further recognition of the digital content represented by the ink objects, as described below.

In the determination or interpretation of the editing stroke 1300, the ink management system 112 refers to the recognition candidates referenced to the strokes in the proximity of the editing stroke location. The range of this proximity may be pre-set and/or user settable (e.g., via a UI menu) and should generally take into account processing burden and timing, which may affect user experience. For example, the location of the editing stroke 1300 between the strokes 1006 and 1007 substantially coincides with the space candidate identified in the recognition candidates 1204 and 1208 between the alternative character candidate $C_{14}$' and the character candidate $C_{15}$. Accordingly, the ink management system 112 determines, or causes the HWR system 114 to determine (e.g., through provision of a suitable probability weighting), that the editing gesture 1300 is a delete space gesture. This determination may at least in part be performed, for example, with the gesture detection and recognition described in U.S. patent application Ser. No. 14/989,217 titled "System and Method for Note Taking with Gestures" filed in the name of the present Applicant and Assignee, the entire content of which is incorporated by reference herein.

Similar delete actions can be taken on the content itself, such as on the text characters, words, sentences, paragraphs, etc., and non-text elements. Further, due to the fine reference indexing (particularly the precision indexing using stroke sub-points) partial deletion of characters, etc., is possible since only those parts of the digital ink will be omitted and the recognition adjusted accordingly to revise the ink objects. For example, the gesture which selected the descenders of the characters in the strokes 901, 902 and 903 of the paragraph 500 in FIG. 9 may be a deletion gesture for these element components, such that only the digital ink portions corresponding to the reference indexes of these parts are omitted. Alternatively or additionally, partial deletions which are actually intended as full deletions (e.g., a scratch-out or strike-through gesture made by a user only partially selected or misses one or more characters at the end of word, or one or more words at the end of a sentence), can be properly handled by the ink management system 112 to output full deletions as the partial character reference indexes belong to full character reference indexes, character reference indexes belong to word reference indexes, word reference indexes belong to sentence reference indexes, and so on, such that the digital ink of the greater reference indexes are deleted.

The ink management system 112 may be configured to retain the digital ink of any deleted reference index ink, either permanently or for a certain amount of time or number of subsequent operations, for example, by storing the digital ink in the memory 108 of the device 100, so that deletions can be undone, through UI selection or the like. Alternatively or additionally, only the deleted reference indexes may be retained along with the underlying recognition results (e.g., the partial or entire ink objects) as metadata in the ink objects and/or the memory 108 so that upon an undo action, the restored digital ink can be generated based on the recognition results and appropriate handwriting like fonts, such as personal user fonts produced by sampling a user's handwriting. Accordingly, the ink objects of the present system and method are managed similar to digital objects with similar editing functionality but also provide enhanced functionality as the interactions with the ink objects are augmented by the underlying handwriting recognition and allow interaction with partial content elements, which cannot be performed with digital objects.

Figure 13C:
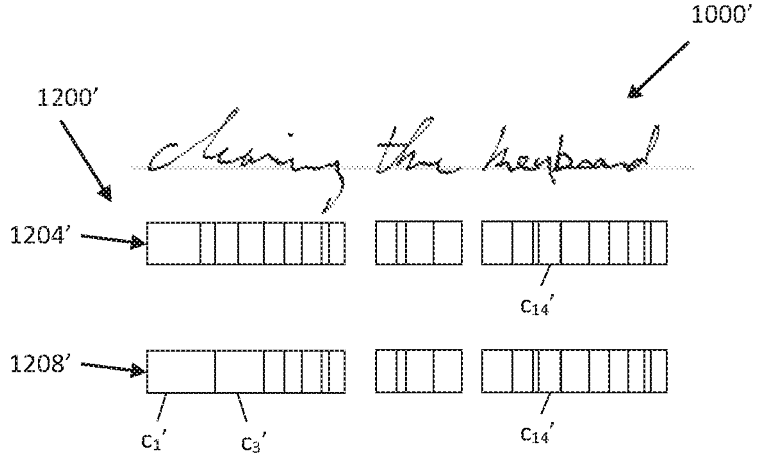
FIG. 13C shows the adjusted digital ink with an example adjusted recognition with representations of adjusted example segmentations.

Returning to the example of FIG. 13, the delete space determination causes a change in the recognition candidates. For example, the recognition candidates 1202 and 1206 may be omitted from the ink objects or downgraded from the most likely recognition candidates list through provision of a suitable probability weighting by the ink management system 112, and the recognition candidates 1204 and 1208 are revised and may be elevated or promoted in the most likely recognition candidates list through provision of a suitable probability weighting by the ink management system 112. FIG. 13C shows an example revised or edited recognition 1200' having the representations of revised segmentations 1204' and 1208' of the edited phrase 1000'. In the revised segmentations 1204' and 1208' the recognition processing may further cause the character candidate $C_{14}$' to be recognized as a "y" omitting or downgrading the "n" candidate, since the joined strokes 1006 and 1007 now likely form the word "keyboard" which based on the language model the HWR system 114 may determine as more likely. This increased likelihood may also be used by the ink management system 112 in the determination of the editing gesture 1300, as may the entire original and edited phrases 1000 and 1000'.

As described earlier, the range of proximate strokes to an editing stroke or action takes into account the efficiency of any further recognition processing necessary. The allowed range is relatively generous however since the efficiency is enhanced by the ink objects due to already or existing recognized elements of the input/digital ink not needing to be re-recognized. That is, as described above, only new input is recognized and previous recognition result(s) are retained, revised or omitted in accordance with the referencing made thereto. It is understood however that in some cases previous recognition result(s) may not assist the recognition of the new input, or may require re-recognition together with the new input, such that re-recognition may occur albeit limited to that necessary for recognition of the new input.

Figure 14A:
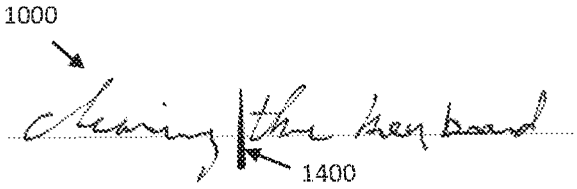
FIG. 14A shows the digital ink of FIG. 10 with an example input editing gesture.

The new 'input' of the example of FIG. 13 represented an editing or control action on the content, and not content itself. The present system and method is also applicable to new content input, for example as follows. FIG. 14A shows the digital ink 1000 with an editing gesture 1400 detected by the ink management system 112 and/or the HWR system 114 as input as a top-to-bottom vertical line in a single stroke by a user swiping their finger or stylus tip from the top to the bottom in the displayed position shown, for example. That is, the stroke start position is above the stroke end position, in time order, as depicted by the gradual thickening of the stroke from the top to the bottom. The illustrated characteristic of the editing stroke is an example, and other characteristics are possible, such as a wedge, as are other forms of editing commands (described in detail later). The editing stroke 1400 is detected as passing between the strokes 1001 (and 1002) and 1003 (and 1004), and as such the ink management system 112 knows the relative location of the editing stroke 1400 not only to the digital ink 1000 but also to each of the candidate recognitions, e.g., 1202 to 1208, of the underlying recognized ink.

Figure 14B:
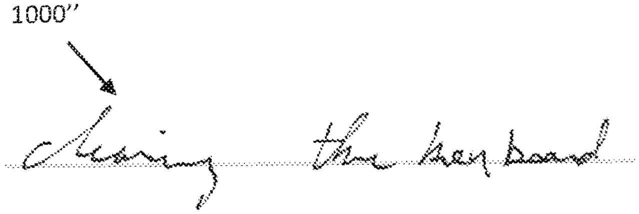
FIG. 14B shows an example adjustment of the digital ink based on the editing gesture of FIG. 14A.

Consideration of this relative location of the editing gesture 1400 and its top-to-bottom writing direction may result in a determination that the editing gesture 1400 is intended by the user to break or split the digital ink 1000 at the detected location. With this determination, the ink management system 112 causes the digital ink 1000 to be re-rendered as edited digital ink 1000" as shown in FIG. 14B, in which the strokes 1001 (and 1002) and 1003 (and 1004) are provided with a space therebetween. The size of this space may be pre-set and/or user settable (e.g., via a UI menu) and is generally sized to allow subsequent input to be provided in that space. However, just a normal (based on the text template or the like) sized single space may also be provided. This editing of the digital ink is accompanied by any suitable further recognition of the digital content represented by the ink objects. In the determination or interpretation of the editing stroke 1400, the ink management system 112 refers to the recognition candidates referenced to the strokes in the proximity of the editing stroke location, as in the example of FIG. 13. For example, the location of the editing stroke 1400 between the strokes 1001 (and 1002) and 1003 (and 1004) substantially coincides with a space identified in all of the (most likely) recognition candidates 1202 to 1208. Accordingly, the ink management system 112 determines, or causes the HWR system 114 to determine (e.g., through provision of a suitable probability weighting), that the editing gesture 1400 is an add space gesture. This determination may at least in part be performed, for example, with the gesture detection and recognition described in the afore-incorporated by reference U.S. patent application Ser. No. 14/989,217, for example.

Content insertion could also be made by overwriting on existing content. Such actions may be interpreted by the ink management system 112, for example, as deletion of the overwritten content and insertion of the new input, or the addition of the new input to the existing content (such as turning an "l" into a "t" by addition of the bar "-"). As discussed above, this includes partial overwriting/deletion of characters, etc., and provision of undo actions through retention of the digital ink and/or reference indexes.

The ink management system 112 may be configured to display the input editing stroke(s) as digital ink, either with a shape as, for example, shown in FIGS. 13A and 14A, or some other appropriate rendering until the recognized editing operation is performed or may just perform the editing operation without such display. The display of the detected editing gesture may be used to provide recognition feedback to users with respect to recognition of the gesture itself and the relative location thereof. Otherwise, the eventual editing operation, e.g., the modified display shown in FIGS. 13B and 14B, may be used for such feedback.

Figure 14C:
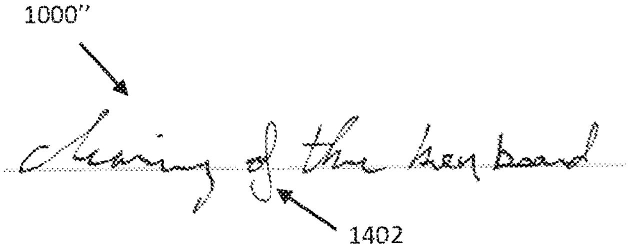
FIG. 14C shows the adjusted digital ink with new example handwritten content input to the input area rendered as new digital ink.

FIG. 14C shows the edited digital ink 1000" with new input 1402 detected by the ink management system 112 and/or the HWR system 114 as being within the space between the strokes 1001 (and 1002) and 1003 (and 1004), thereby forming the edited phrase 1000" of "cleaning of the keyboard". The raw (and digital) ink 1402 includes a stroke representing text characters which form the word "of". As discussed earlier, the ink management system 112 segments the stroke to produce a reference segmentation used to determine the reference index of the input, and therefore the digital ink. For example, the stroke index of the new stroke 1402 may be stroke [9], i.e., sequentially carrying on from the stroke 1009 which is stroke [8], and may be segmented to have 60 points, say, such that, for example reference index $r_{22}$ corresponds to [9:0, 9:30] and reference index $r_{23}$ corresponds to [9:30, 9:60]. As described above, extra precision can be provided by also referring to sub-points. In this way, the reference indexes of the previously indexed content are not disturbed and the new input is referenced in combination with the existing content.

As with non-content input, like the editing gesture 1400, consideration of the relative location of the new input 1402, with reference to the recognition candidates referenced to the strokes in the proximity of the new stroke location as described earlier, may result in a determination that the new input is intended by the user as new content to the digital ink 1000' at the detected location, particularly with respect to the recognition candidates 1202 and 1204 (described in detail below). With this determination, the ink management system 112 may cause further re-rendering of the edited digital ink 1000' to provide additional space for content insertion and then reduce this space once the new content has been input, for example. Alternatively, users may be required to insert further space to allow for this. This editing of the digital ink is accompanied by any suitable further recognition of the digital content represented by the ink objects, for example, by the ink management system 112 determining, or causing the HWR system 114 to determine (e.g., through provision of a suitable probability weighting), that the stroke 1402 is new content, such that the recognition processing of the new content may be carried out faster since the type of input has already been determined or pre-processed. Accordingly, in the recognition process the new stroke 1402 is segmented in order to determine probable character candidates which lead to the recognition of the word "of" of the new input 1402, where this recognition is performed with reference to the existing recognition candidates but without disrupting those candidates unless this is determined to be necessary (such as characters being added to a word, for example).

Figure 14D:
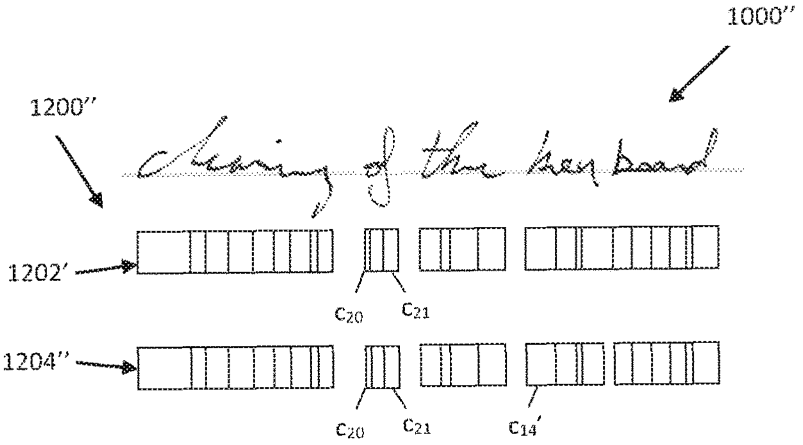
FIG. 14D shows adjusted and new digital ink with an example adjusted recognition with representations of adjusted example segmentations.

In the present example, this recognition causes a change in the recognition candidates. For example, FIG. 14D shows an example revised or edited recognition 1200" having the representations of revised segmentations 1202' and 1204" of the edited phrase 1000". In each of the revised segmentations 1202' and 1204" the stroke 1402 is segmented to produce additional recognized characters of the series of recognized characters $C_n$. That is, the segmentation of the strokes 1001 to 1009 is unchanged. The additional recognized characters $C_1$, include "o" $C_{20}$ and "f" $C_{21}$. As in the examples before, each of the revised recognition segmentations 1202' and 1204" correspond generally with the reference segmentation such that the ink management system 112 maps the expanded reference indexes $r_m$ to the expanded candidate characters $C_n$. That is, the new character $C_{20}$ corresponds to reference index $r_{21}$, the new character $C_{21}$ corresponds to reference index $r_{22}$ and the mapping of the existing candidate characters and reference indexes for the other strokes 1002 to 1009 is maintained. Accordingly, the underlying recognition 1202' and 1204" of the digital ink 1000 may be determined via the reference indexing as word[0:0, 1:10] corresponding to "cleaning", word[9:0, 9:60] corresponding to "of", word[2:0, 3:10] corresponding to "the", and word[4:0, 8:40] corresponding to "keyboard", for example, where a fourth ink object corresponds to the reference index [9:0, 9:60].

In this example, the recognition candidates 1206 and 1208 are omitted from the ink objects or downgraded from the most likely recognition candidates list through provision of a suitable probability weighting by the ink management system 112, and the recognition candidates 1202 and 1204 are revised and may be elevated or promoted in the most likely recognition candidates list through provision of a suitable probability weighting by the ink management system 112. This is because, in both of the recognition candidates 1206 and 1208 the strokes 1001 and 1002 correspond to the candidate recognition "during" and based on the language model the HWR system 114 determines the likelihood of the phrases "during of the keyboard" or "during of the ken board", for example, to be relatively reduced from the recognition of the original input 1000. On the other hand, the relative likelihoods of the revised recognition candidates 1202' and 1204" of "cleaning of the keyboard" and "cleaning of the ken board", respectively, are most likely about the same as for the original recognition candidates 1202 and 1204.

Accordingly, the ink management system 112 manages interactions to edit the digital ink by adjusting the ink objects corresponding to each of the digital ink characters, words, etc., that are interacted with through re-rendering of the digital ink and revision or adjustment of the underlying recognition candidates corresponding thereto. As such, the ink objects are updated with any editions made so that upon conversion of the digital ink content into typeset or fontified content (e.g., upon finalization of a document), the typesetting is performed based on the updated ink objects so that the most current and applicable recognition results are used in the conversion.

Further, as with the digital ink and/or reference indexes of the deletion and insertion actions described above, the ink objects may be retained by the ink management system 112 after typesetting is performed so that undo actions can be similarly taken to revert back to the digital ink. The ink objects may be retained upon conversion to digital objects, either permanently or for a certain amount of time or number of subsequent operations, for example, by storing the ink objects in the memory 108 of the device 100. Alternatively, the retention of the ink objects through typesetting may be performed by merely re-rendering the digital ink as typeset ink, so that the digital content remains characterized by the ink objects, rather than converted to digital objects. In this way, interactions with the typeset ink are treated by the ink management system 112 in similar fashion to the interactions with the digital ink. That is, reference is made to the related underlying recognition results such that similar functionality is provided. This is particularly useful in providing the ability to input mixed content, e.g., handwriting revisions or annotations on typeset content, where the handwritten input is interpreted with reference to the existing ink objects to provide seamless integration of the handwriting into the typeset content. The reverse is also possible, with typed content being added to handwritten digital ink. In this case, the decoded keystrokes may be treated by the ink management system 112 as recognition candidates so that the typed content is formulated as ink objects. Similar possibilities apply for mixed non-text content which is input with handwriting or with digital input tools.

Figure 15A:
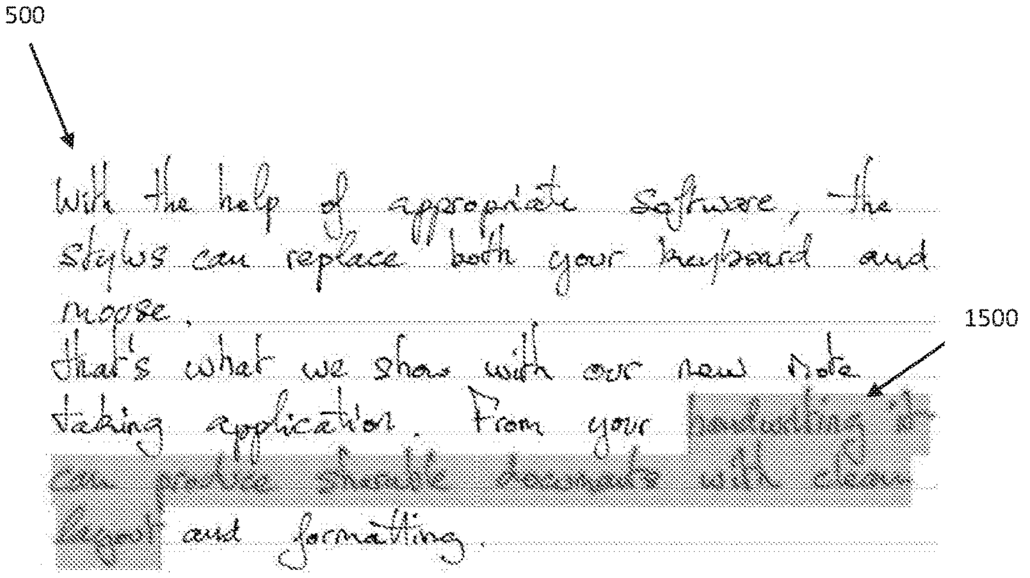
FIG. 15A shows the digital ink of FIG. 5 with an example content portion highlighted as selected.
Figure 15B:
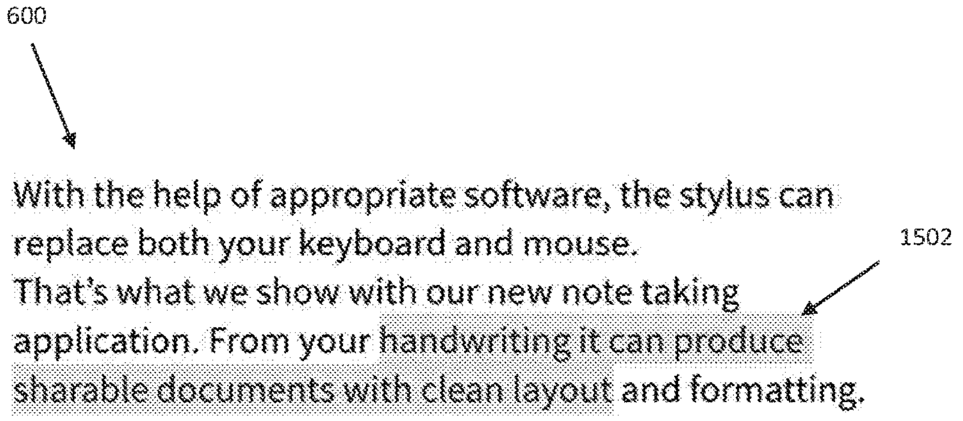
FIG. 15B shows the typeset ink of FIG. 6 with an example content portion highlighted as selected.

As mentioned earlier, editing commands other than the handwritten editing gestures may also be used to edit the ink objects. These editing commands include traditional editing commands such as those provided via UI menus, keyboard (e.g., backspace) and mouse (e.g., select). That is, as discussed earlier, the reference indexing allows substantially precise placement of an input cursor with respect to the digital ink and also provides precise knowledge of the extent of content elements, such as text characters. Accordingly, regardless of whether the rendered ink is digital ink or typeset ink, a cursor can be positioned at element boundaries, such as at character boundaries, and the traditional editing commands can therefore be used similar to digital objects. For example, FIG. 15A shows the digital ink paragraph 500 of FIG. 5 with a portion 1500 of the paragraph selected and FIG. 15B shows the corresponding typeset ink paragraph 600 of FIG. 6 with a portion 1502 of the paragraph selected. In both drawings the selections are of the same content and are shown as a highlighted selection region as commonly provided in document processing applications. The selection regions 1500 and 1502 are rendered at the character boundaries of the respective digital and typeset ink characters, that is with the cursor positions. Accordingly, in both cases the ink objects corresponding to the reference indexes of the selected content are selected for any subsequent interaction.

Use of handwriting on computing devices for the creation of digital content is advantageous because these devices do not have the physical limitations of paper, such as size, number of pages. However, creating digital content with handwriting is not currently as easy or as effective as typing because of the way digital ink is traditionally managed. Conventionally, digital content is made of typed text objects or digitally drawn non-text objects, such as shapes and equations. Current digital ink management captures handwritten objects as pixels or strokes, which does not fit with the digital content model. This leads to creators having to re-enter content by typing with keyboard or using complex tools for creation and editing of non-text content.

Handwriting recognition technology can avoid this re-entry paradigm. However, as handwriting is generally unstructured with text of various size and orientation and combined with non-text, performing recognition on the whole content at once, as it is conventionally done, does not provide the best use of this technology. This leads to creators having to make many post-recognition edits to create publishable digital content, significantly limiting the productivity gain that handwriting recognition could provide.

The present system and method dramatically improves the productivity of digital ink through the ink management system. The ink management system provides interactive ink that is as easily manageable as typed digital content through the combination of the digital ink with “on-the-fly” recognition, for text and non-text. This combination of the digital ink and the recognition results transforms the digital ink into ink objects which are interactive like typed objects and can be manipulated with intuitive gestures akin to those of keyboard, like backspace and enter, and mouse, like select and drag‘n’drop. Interaction with the digital ink provides an intuitive user experience, even for non-tech savvy users.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for providing interactive ink on a computing device, the computing device comprising a processor, a memory and at least one non-transitory computer readable medium for recognizing handwriting input under control of the processor, the at least one non-transitory computer readable medium configured to:

cause display of, on a display interface of the computing device, first digital ink in accordance with first handwriting input;

allocate spatial or temporal references to ink elements of the first digital ink;

map the spatial or temporal references to corresponding recognized elements of the first handwriting input; and determine and store, in the memory of the computing device, ink objects including the spatial or temporal references and mapped recognized elements.

2. The system according to claim 1, wherein the ink elements are at least part of strokes of the first digital ink.

3. The system according to claim 1, wherein the recognized elements include at least part of strokes of the first handwriting input.

4. The system according to claim 3, wherein the recognized elements are recognition candidates of the first handwriting input.

5. The system according to claim 1, the at least one non-transitory computer readable medium configured to:

determine content of second handwriting input by referring to the ink objects; and cause display of, on the display interface, second digital ink in accordance with the determined content of the second handwriting input.

6. The system according to claim 5, wherein the second digital ink is an edited version of at least part of the first digital ink.

7. A method for providing interactive ink on a computing device, the computing device comprising a processor and at least one non-transitory computer readable medium for recognizing handwriting input under control of the processor, the method comprising:

displaying, on a display interface of the computing device, first digital ink in accordance with first handwriting input;

allocating spatial or temporal references to ink elements of the first digital ink;

map the spatial or temporal references to corresponding recognized elements of the first handwriting input; and determining and storing, in the memory of the computing device, ink objects including the spatial or temporal references and mapped recognized elements.

8. The method according to claim 7, wherein the ink elements are at least part of strokes of the first digital ink.

9. The method according to claim 7, wherein the recognized elements include at least part of strokes of the first handwriting input.

10. The method according to claim 9, wherein the recognized elements are recognition candidates of the first handwriting input.

11. The method according to claim 7, further comprising:

determining content of second handwriting input by referring to the ink objects; and displaying, on the display interface, second digital ink in accordance with the determined content of the second handwriting input.

12. The method according to claim 11, wherein the second digital ink is an edited version of at least part of the first digital ink.

13. A non-transitory computer readable medium having a computer readable program code embodied therein, said computer readable program code adapted to be executed to implement a method for providing interactive ink to a computing device, the computing device comprising a processor and at least one system non-transitory computer readable medium for recognizing handwriting input under control of the processor, the method comprising:

displaying, on a display interface of the computing device, first digital ink in accordance with first handwriting input;

allocating spatial or temporal references to ink elements of the first digital ink;

map the spatial or temporal references to corresponding recognized elements of the first handwriting input; and determining and storing, in the memory of the computing device, ink objects including the spatial or temporal references and mapped recognized elements.

14. The non-transitory computer readable medium according to claim 13, wherein the ink elements are at least part of strokes of the first digital ink.

15. The non-transitory computer readable medium according to claim 13, wherein the recognized elements include at least part of strokes of the first handwriting input.

16. The non-transitory computer readable medium according to claim 15, wherein the recognized elements are recognition candidates of the first handwriting input.

17. The non-transitory computer readable medium according to claim 13, further comprising:

determining content of second handwriting input by referring to the ink objects; and displaying, on the display interface, second digital ink in accordance with the determined content of the second handwriting input.

18. The non-transitory computer readable medium according to claim 17, wherein the second digital ink is an edited version of at least part of the first digital ink.

* * * * *